United States Patent [19]

Hill et al.

[11] 3,828,732

[45] Aug. 13, 1974

[54] REVERSE FLOW FLUSHING APPARATUS FOR ANIMAL HOUSING SYSTEMS

[76] Inventors: Robert Hill, 150 Rolino Way, Los Gatos, Calif. 95050; George D. Bliss, 852 Southhampton Dr., Palo Altos, Calif. 94303; Janos B. Szakacs, 535 Everett Ave., Palo Altos, Calif. 90058

[22] Filed: June 12, 1972

[21] Appl. No.: 261,824

[52] U.S. Cl. .................................................. 119/22
[51] Int. Cl. ............................................ A01k 01/00
[58] Field of Search ............................... 119/22, 28

[56] References Cited
UNITED STATES PATENTS
2,523,615  9/1950  Fell .................................... 119/22
2,701,547  2/1955  Shaw .................................. 119/22

*Primary Examiner*—Hugh R. Chamblee
*Attorney, Agent, or Firm*—George B. Almeida

[57] ABSTRACT

A self-cleaning cage system which includes a combination of features. Reverse flow flushing apparatus may be fed via an integral tubular frame assembly, which thus doubles as a water delivery system and a support means for the cages. A readily tiltable drain system is contemplated integral with the reverse flow flushing apparatus, to provide a water drain system which allows draining the waste water from the left or the right side of the cage. The invention combination contemplates removal of animal or bird excreta by releasing a large volume of water of relatively low pressure into the flush pan of a cage. The flush pan bottom has a relatively shallow slope to thus allow a deep build-up of water introduced at the low side of the slope. The resulting build-up of water floats the excreta from the flush pan rather than forcing it off via high pressure jets of water. The water input and drain systems are disposed at the same side (the low side) of the flush pan.

11 Claims, 8 Drawing Figures

PATENTED AUG 13 1974
SHEET 1 OF 3
3,828,732
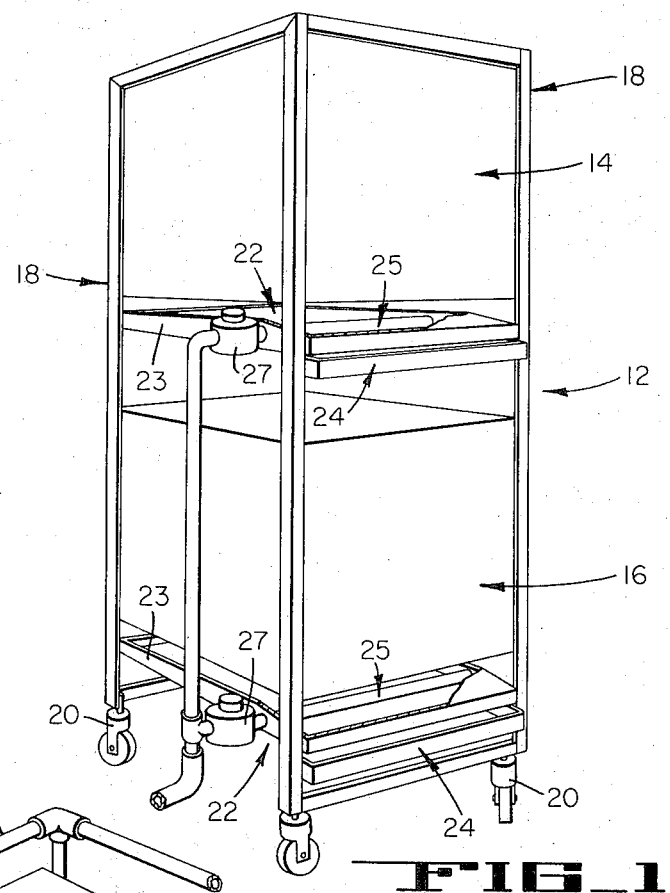
FIG_1
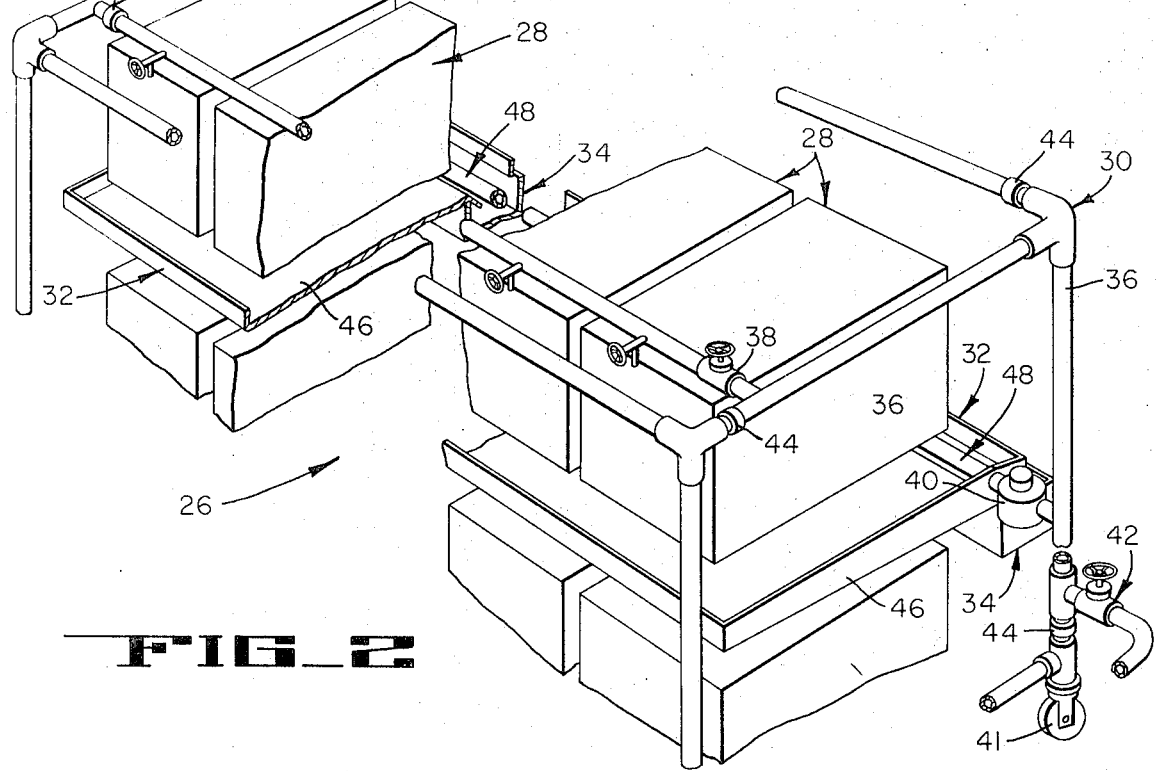
FIG_2

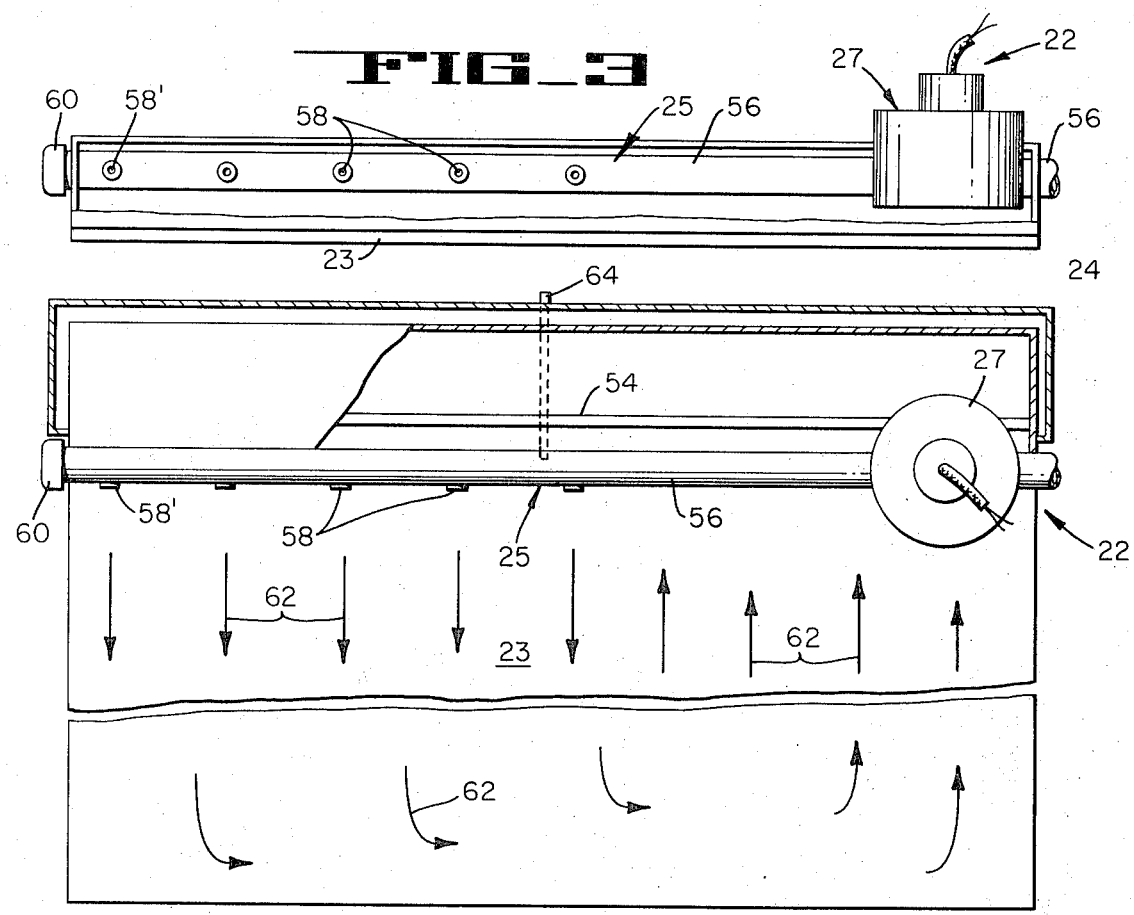
FIG_3
FIG_4
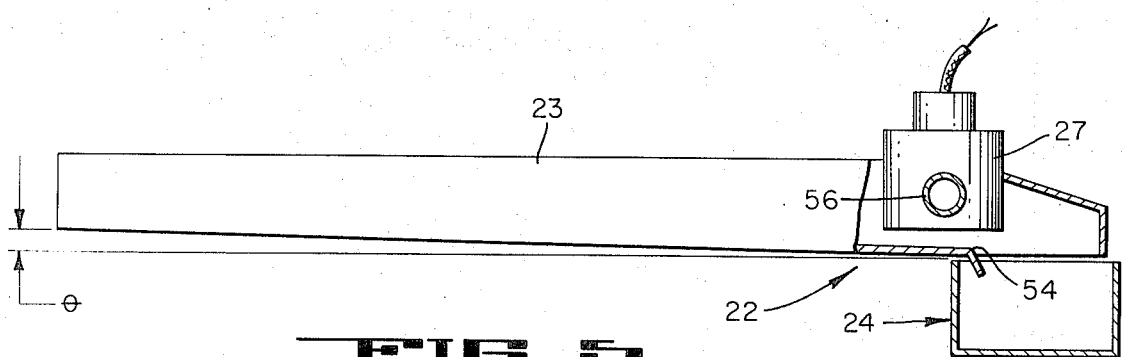
FIG_5

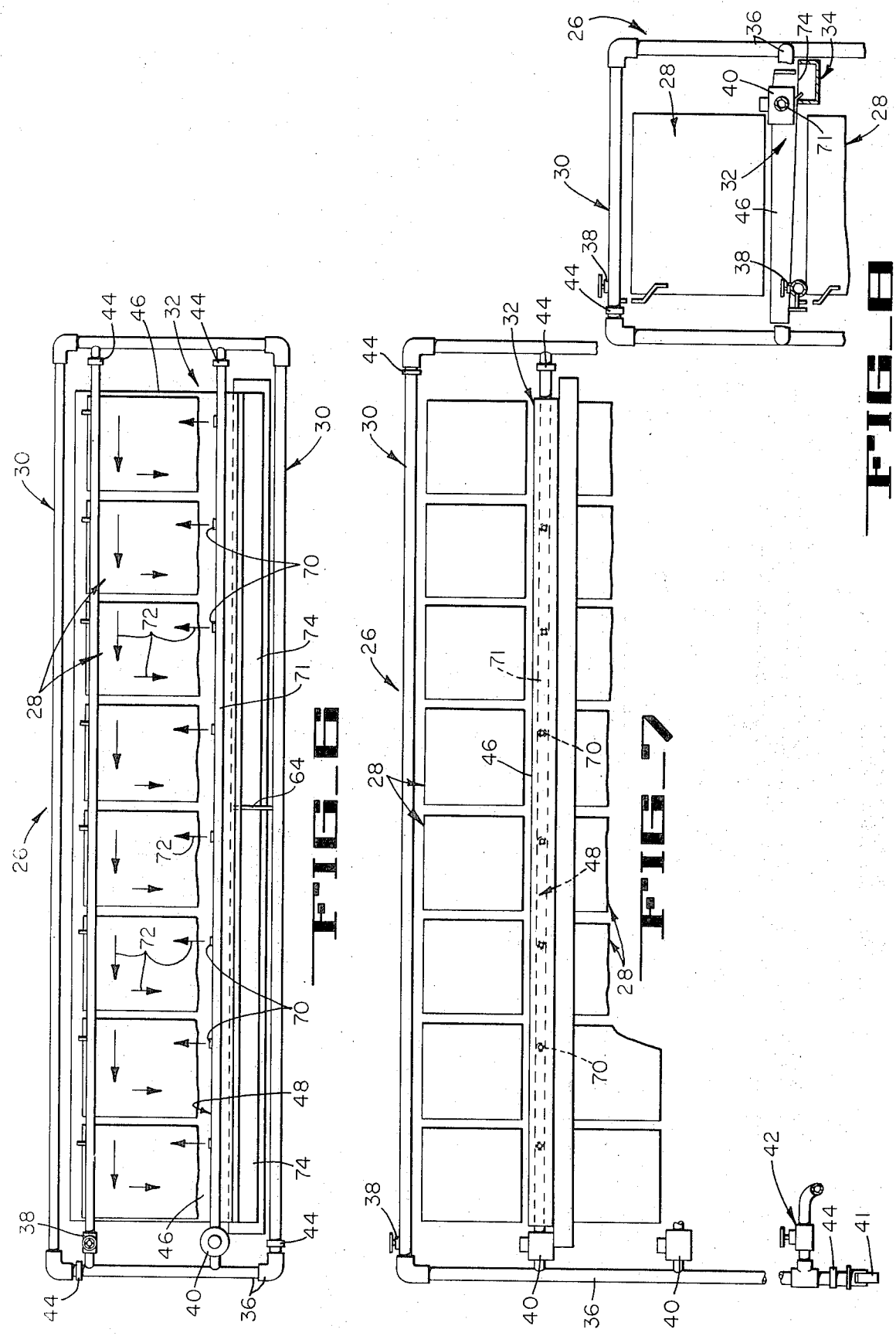

REVERSE FLOW FLUSHING APPARATUS FOR ANIMAL HOUSING SYSTEMS

BACKGROUND OF THE INVENTION

1. Field

The invention relates to animal housing systems, and particularly to an improved construction for self-cleaning animal and bird cages.

2. Prior Art

Various types of automatic housing systems are presently available, which achieve equally varying degrees of success in cleaning the excreta from under animal cages. Typical of such systems are the self-cleaning housing systems which employ a front-to-back flushing method. The flushing water is ejected under relatively high pressure from a series of jets in a pipe disposed, for example, along the front of the cage. The jets are located generally at the high side of a sloping flush pan, which is disposed under the cage to receive the excreta. The excreta is thus forceably removed from the flush pan at the back or low side thereof, by the impinging high pressure jets of water. This method is generally feasible for smaller animal housing systems, such as those for rodents, etc., but is only partially effective for large animal systems such as those used with dogs, primates, etc.

Another self-cleaning housing system employs a cascading water flow method, which releases a large volume of water into the flush pans at successive levels (in a multi-level cage arrangement). The water traverses the successive flush pans disposed under the cages in alternate directions. In such a cascading water flow method, the water is introduced at the high side of the sloping flush pan, and the waste water with excreta is drained from the opposite or low side of the flush pan. The latter system is partially effective as a flushing system in some cage systems such as those for primates, but is rather ineffective for other animal housing systems, such as those used with dogs.

Note that in the above prior art flushing systems the water enters at one side of the flush pan, and exits at the opposite side of the flush pan. Also, the bottom of the flush pan has a relatively large slope (e.g., at least one inch per foot) to aid in the rapid flow of water thereacross in the attempt to forceably remove the excreta therefrom.

SUMMARY OF THE INVENTION

The present invention provides a self-cleaning housing system for automatically flushing the excreta of all animals and birds, including dog excreta, with substantially 100 percent effectiveness, thereby overcoming the shortcomings of the prior art systems of previous mention.

A water input system formed of the tubular frame of the housing system unit, may be employed to deliver input water to the rear, or lower, side of the flush pan of a cage. A water discharge manifold extends across the rear or low side of the flush pan, and contains a selected plurality of discharge orifices, which thus extend across a selected portion of the flush pan under a cage. The bottom of the flush pan slopes slightly downward to a drain gutter located along the back thereof, the gutter being disposed below the discharge manifold at the same side of the flush pan.

A large volume of water under relatively low pressure, is released from the manifold and flows up substantially half of the flush pan area corresponding to one-half of the cage width, building to a depth of the order of an inch or more. The depth of water causes the excreta to become buoyant, whereby the invention combination contemplates floating the excreta from the flush pan. The upward flow of water spreads out along the front, or high, side of the flush pan, and swirls back across the half of the flush pan corresponding to the other half of the cage width, to float and thus flush out any excreta thereon. The waste water with debris is returned to the same side of the cage wherefrom the water is introduced; i.e., the rear or low side of the flush pan in this example, and is drained via the drain gutter. The drain gutter can be selectively tilted to allow draining towards either side of the cage, or can be rigidly secured to the wall behind the movable cage system with the desired tilt.

BRIEF DESCRIPTION OF THE DRAWINGS

FIGS. 1 and 2 are perspectives of movable large animal, and small animal, rodent or bird cage systems respectively, depicting the general construction, arrangement, etc., thereof in conjunction with the invention concepts.

FIGS. 3, 4 and 5 are elevation, plan and end views respectively of the invention, depicting in particular the reverse flow flushing apparatus as utilized, by way of example only, in a large animal cage system of FIG. 1.

FIGS. 6, 7 and 8 are plan, elevation and end views respectively of the reverse flow flushing apparatus, the tubular frame assembly and the tiltable drain system of the invention combination as utilized by way of example in the small animal multiple cage system of FIG. 2.

DESCRIPTION OF THE PREFERRED EMBODIMENTS

Referring to FIG. 1, there is shown a generally conventional configuration for a one-over-one animal housing system 12 for large animals, such as dogs, primates, etc. Two cages 14, 16 are stacked vertically to double the number of cages in a given floor space. A generally rigid frame 18 formed, for example, of angle iron, supports the cages 14, 16 and includes casters 20 to allow readily moving the system 12 within a room, or from room to room. A flushing system 22 is disposed immediately below respective cages 14, 16. In accordance with the invention combination, the flushing system 22 includes a flush pan 23 having a shallowly sloping bottom, in combination with a discharge manifold 25 for introducing excreta flushing water with a selected flow pattern eg, arcuate, forward-and-back, etc, into the flush pan from substantially the low side thereof. Obviously, the water flow pattern may vary depending upon the configuration and disposition of the manifold 25 relative to the flush pan 23. The prime requirement is that the flushing water be ejected in a direction whereby it flows up or across the shallowly sloping bottom to provide the selected depth of water required to float the excreta, as previously described. A solenoid valve 27 determines the timing and length of the water discharge, as further described infra. In addition, gutter means 24 is provided with each flushing system 22 to drain the water and debris from the flush pan 23. The invention combination contemplates various gutter means; e.g., a pair of interconnected gutter means with a single outlet, tiltable gutter means integral with the cage system, or fixed gutter means secured to a wall behind the cage system, for a one-over-one housing system.

FIG. 2 depicts a generally conventional configuration for a multiple cage housing system 26 for smaller creatures such as rabbits, guinea pigs, rats, mice, etc. Horizontally extending series of wire cages 28 are stacked to provide several levels of cages, wherein one housing system may include from one to three dozen cages. The housing system 26 includes a tubular frame assembly 30 which structurally supports the plurality of cages 28, while incorporating selected piping means in accordance with the invention, for providing water delivery for drinking and flushing purposes. Flushing systems 32 of the invention are disposed immediately below each horizontally extending series of cages 28, each providing self-cleaning of respective levels of the cages. Gutter means 34 are provided integral with each flushing system 32 to drain the water and debris from the latter system.

More particularly, the tubular frame assembly 30 includes piping 36 integral therewith, which provides water passageways to a drinking water valve 38 and an automatically actuated solenoid valve 40 associated with each flushing system 32. The assembly 30 is supported on casters 41. The water is introduced to the tubular frame assembly from a suitable source (not shown) via valve means 42. Plug means 44 may be inserted within the tubular frame assembly 30 at chosen locations therein, to limit the flow of water to the valves 38, 40, rather than allowing flow throughout the entire assembly 30. Obviously the valves 38, 40 and 42 may be manually operated, or may include solenoid or similar actuaters which automatically open and close the valves at selected intervals. Although only a single flushing system 32, gutter means 34, solenoid valve 40, etc., is shown here, it is to be understood that one of such combinations is employed with each level of cages 28.

The flushing system 32 includes a flush pan 46 which extends beneath the full lengths of each of the series of cages 28. The solenoid valve 40 is coupled to a discharge manifold 48 which extends the full length of the flush pan 46, along the rear thereof. The manifold 48 is essentially a single length of pipe 50 with an orifice 52, or selected plurality of orifices, located therein along all or selected portions of the pipe corresponding the entire length or to predetermined areas of the flush pan located under each cage 28, as further described below.

FIGS. 3-5 depict in further detail, the flushing system 22 employed in the large animal housing system 12 of FIG. 1, comprising the flush pan 23, the discharge manifold 25, and the solenoid valve 27. The flush pan 23 is disposed immediately below the floor of the cage such as provided in suspended wire or grid floored cages, whereby excreta passes through the floor onto the flush pan. A discharge opening 54 is formed in the pan bottom along the lower (back) side. In accordance with the invention, the bottom of the flush pan 23 is sloped down towards the back of the cage; i.e., the slope (O) of the pan is of the order of one-eighth inch per foot of length (FIG. 5). The depth of the flush pan 23 preferably does not exceed 2½ inches for the large animal cage syste of FIG. 1.

By way of example only, the discharge manifold 25 includes a length of pipe 56 of selected diameter (i.e. three-fourths inch, 1 inch, etc.) disposed across the low (back) side of the pan 23 in the region above the front edge of the discharge opening 54. Valve 27 is disposed in pipe 56. The discharge manifold 25 is supported slightly above the pan floor, and has a plurality of orifices 58 therein along substantialy 60 percent of the width of the flush pan 23 (for the large animal cages of FIG. 1). The end of the pipe 56 is plugged as with plug 60. The vertical distance from the bottom of the manifold 25 to the bottom of the pan 23 is preferably of the order of the diameter of the pipe 56. The outlet orifice 58' nearest the plug end of the pipe 56 is spaced from the side wall of the flush pan 23 preferably one-half the distance between the orifices 58. The combined area of all the orifices 58, 58' is preferably substantially that of the area of the pipe 56 cross section. The orifices 58 thus may comprise one-fourth inch holes drilled 8 inches apart.

To improve the flow pattern of the water discharged from the manifold, the "orifices" 58, 58' may include rubber or plastic grommets pressed, threaded, etc., into holes formed in the pipe 56. The grommets extend a selected distance into the pipe 56 to cause a breakup of the laminar flow of water therein. This in turn prevents the water flow from the orifices from being affected by the direction of water flow in the pipe 56.

In operation, water is introduced to the solenoid valve 27 via the tubular frame piping 36 of FIG. 2, a hose connection (not shown), and/or any other water source input. When flushing is desired, solenoid valve 27 is opened via a suitable electrical, hydraulic, etc. signal, whereupon a large volume of relatively low pressure water is discharged from the manifold 25, over substantially 50 percent to 60 percent of the flush pan width (e.g., see flow arrows numbered 62, FIG. 4). The water flows up the flush pan 23, thus building to a depth of, for example, an inch or more to provide a sufficient depth of water to cause canine, primate, etc., stools to become buoyant. The uphill flow of water spreads out across the high (front) side of the pan 23, swirls across the pan width to lift stools on the remainder of the pan, and returns to the discharge opening 54 at the low side of pan 23. The water and excreta thus drains from the pan under the discharge manifold 25.

The gutter means 24 includes a trough disposed immediately below the discharge opening 54 at the rear of the flush pan 23. The trough may be pinned as at 64 (FIG. 4) whereby it may be tilted through a selected angle in either direction such that the drain water and debris is discharged from either side of the housing system.

FIGS. 6-8 depict in further detail the tubular frame assembly 30 and the flushing system 32, as employed in the small animal housing system 26 of FIG. 2. It is to be understood that the tubular frame assembly 30 may readily be used to support and deliver water to the large animal housing system 12 of FIG. 1, and is thus not limited to use with only the system of FIG. 2 as described here. Tubular frame assembly 30 includes the water conducting piping 36, the plug means 44, the valve means 42, and casters 41 of previous mention in FIG. 2. The piping 36 provides water delivery to the drinking water valves 38 and the automatically actuated solenoid valves 40, of each level of cages 28.

The flushing system 32 includes the continuous flush pan 46, the discharge manifold 48 and the solenoid valve 40, and is disposed immediately below each level of cages 28. Note a single, continuous flush pan 46 is shown here in combination with the continuous discharge manifold 48, along the full lengths of each series of cages 28, although individual, separated, flush pans may be used. The bottom of the flush pan 46 has a shallow slope similar to that shown in FIGS. 3–5, and the depth thereof is preferably of the order of one-eighth inch to the foot.

In accordance with the invention, a single orifice 70 (or selected plurality of orifices) is formed in a pipe 71 defining the discharge manifold 48, under each cage 28, wherein the single orifice 70 is located substantially in the middle of one-half of the cage width. The manifold 48 is disposed above the bottom of the flush pan 46 a distance of about the diameter of the pipe 71. During the flushing process, the large volume of low pressure water is released into the area of the flush pan 46 corresponding to one-half of the respective cage width. The water flow pattern under each cage 28 is indicated by arrows 72 (FIG. 6), and corresponds to the flow pattern illustrated via numerals 62 of FIG. 4 in the large animal housing system 12. Thus, water builds up to a preselected depth as it flows up the slope of the flush pan 46 towards the high (front) side of each cage 28, spreads out across the front of the respective portions of the pan 46, swirls across the pan widths corresponding to the respective cages 28, to lift excreta from the pan. The flushing water and debris are returned to a continuous discharge opening 74 located along the lower side of the flush pan 46. Obviously, the invention contemplates that the orifices may be disposed along the entire length of the manifold whereby the water builds up across the entire width of the flush pan, and returns back to the discharge opening at the low end of the pan. Furthermore, the orifices may be disposed at the side of the pan, or at some angle between the low end and the sides.

The pivotable gutter means 34 extends the full length of the opening 74 to receive the flushing water and debris from all the cages of one level. Each gutter means 34 discharges to a sewage outlet individually (not shown), or may discharge to a common drain pipe (not shown) vertically located along the ends of the plurality of gutter means, and thence to the sewage outlet. The gutter means and drain pipes of either the small or large animal housing systems may be further modified to drain from one gutter means to a lower gutter means, and thence from the lowest gutter means to a sewage outlet on the floor.

We claim:

1. A self-cleaning housing system for grid bottomed animal cages including a flush pan disposed immediately below the animal cage to receive excreta thereon, comprising the combination of:
   a reverse flow flushing system including said flush pan, the latter having a slightly sloping bottom, wherein a large volume of water at low pressure is discharged at least in part up the sloping bottom of the flush pan to a depth sufficient to float the excreta from the surface of the pan;
   water delivery means in combination with the flush pan and disposed to selectively provide the large volume of low pressure water directly against the slope of the sloping bottom; and
   water drain means coupled to the flush pan to drain the water and excreta from the low side of the flush pan.

2. The self-cleaning housing system of claim 1 wherein the water delivery means is disposed to eject water directly against the slope of the flush pan to define an arcuate flow pattern across the width of the flush pan sloping bottom.

3. A self-cleaning housing system for grid bottomed animal cages including a flush pan disposed immediately below the animal cage to receive excreta thereon, comprising the combination of:
   a reverse flow flushing system including said flush pan wherein a large volume of water at low pressure is discharged into the flush pan to a depth sufficient to float the excreta from the surface of the pan;
   wherein the reverse flow flushing system includes a water discharge manifold disposed within the flush pan to introduce the large volume of water at low pressure from substantially the low side of the pan;

water delivery means in combination with the flushing system to selectively provide the large volume of low pressure water; and
   water drain means coupled to the flushing system at the same low side of the flush pan as is the manifold.

4. The self-cleaning housing system of claim 3 wherein the water discharge manifold is disposed across the lower side of the sloping bottom of said flush pan means and includes an orifice means having at least one orifice facing up the sloping bottom;
   wherein the water delivery means is coupled to the water discharge manifold to introduce the large volume of water to the latter at periodic intervals and for selected durations; and
   wherein the water drain means is disposed at the same lower side of the flush pan in the region of the manifold, said flushing water and the excreta thus draining from the flush pan under the discharge manifold.

5. The self-cleaning housing system of claim 4 wherein the orifice means is disposed to discharge water up the area of the flush pan corresponding to of the order of one-half the cage width.

6. The self-cleaning housing system of claim 5 wherein the water discharge manifold includes;
   solenoid valve means disposed to regulate the occurrence and flow of water from the water delivery means to the manifold;
   said flush pan includes a water discharge opening formed across the low side thereof in the region below the discharge manifold; and
   said water drain means includes a tiltable gutter below the water discharge opening for draining the water and excreta towards either side of the housing system.

7. The self-cleaning housing system of claim 6 wherein the water delivery means includes a tubular frame assembly for supporting the housing system, said tubular frame assembly including selected piping integral therewith for delivering the water to the discharge manifold via the solenoid valve means.

8. The self-cleaning housing system of claim 7 wherein the combined area of the orifice means is substantially equal to the cross section of the pipe defining the discharge manifold, and the manifold is disposed a vertical distance above the low side of the flush pan substantially equal to the diameter of the pipe.

9. The self-cleaning housing system of claim 6 wherein the housing system includes a horizontally extending series of cages, wherein the flush pan extends under the full length of the series of cages, wherein said discharge manifold extends the full length of the flush pan and includes at least one orifice therein selectively disposed relative to each cage to provide the large volume discharge of water up the flush pan slope under select portions of each cage.

10. The self-cleaning housing system of claim 9 wherein the discharge manifold includes a plurality of orifices formed therein for each cage in the series, which orifices extend over a length thereof corresponding to at least one-half of each cage width.

11. The self-cleaning housing system of claim 4 wherein the orifice means is disposed to discharge water up essentially the full area of the flush pan.

* * * * *